United States Patent Office 3,244,663
Patented Apr. 5, 1966

3,244,663
HIGH TEMPERATURE RESISTANT RUBBER-LIKE COMPOSITION
John F. Corr, Morrisville, Pa., assignor to The Bendix Corporation, a corporation of Delaware, and Vulcanized Rubber and Plastics Company, Morrisville, Pa., a corporation of Maine
No Drawing. Filed May 8, 1958, Ser. No. 733,822
7 Claims. (Cl. 260—41.5)

This invention relates to high temperature resistant synthetic rubber, to articles made therefrom, and to methods of forming articles therefrom.

The invention has among its objects the provision of a novel rubber-like material which stands up for long periods at high temperature without failure or appreciable deterioration, and which displays markedly superior compression set values after treatment in such manner.

Another object of the invention is the provision of a material of the character indicated which is electrically insulating.

A further object of the invention is the provision of an electrically insulating rubber-like material of the character indicated which has intially high electrical resistance, and which retains an outstandingly high percentage of its initial electrical resistance after being held for long periods at elevated temperature.

A still further object of the invention is the provision of an electrically insulating rubber-like material which has initially high dielectric strength and arc resistance, and which retains an outstandingly high percentage of its initial dielectric strength and arc resistance despite its subjection to high temperatures for long periods of time.

Other objects of the invention are to provide a novel rubber-like material of the character indicated which is of lower weight, which has good initial tensile strength, which sustains long periods at elevated temperatures without undue loss in tensile strength and other physical properties, which may be cured in a short time, and which, when cured, sustains heating to elevated temperatures for long periods while immersed in oil or oil-like liquids without undue change in its hardness.

Still other objects of the invention are the provision of a rubber-like material, for the purposes indicated, which is suitable for molding in existing molds, for being vulcanized without dimensional variations beyond existing tolerances, and which sustains the considerable flexing and distortion attendant upon assembly and disassembly operations without damage.

Another object is the provision of improved methods of forming articles, as by molding, from such material, and of curing the formed articles.

A further object is the provision of improved articles made of the rubber-like material of the invention.

The above and further objects of the invention will become apparent upon consideration of the following specification setting forth preferred embodiments of the composition of the material, preferred methods of compounding the material, preferred methods of forming articles from the compounded material, and some permissible variations in such compositions, methods of compounding, and methods of forming articles from the compositions.

In many instances rubber or rubber-like materials are subjected to high temperature during use. Typical of such uses of the material is that in which it is employed as an electrically insulating contact pin-carrying insert in electrical connectors used, for example, in engine compartments of airplanes, such as the connectors to spark plugs and to magnetos. It is most desirable, from the standpoint of economy and safety, that insulating articles such as the above connector inserts and the like shall stand up for long periods without failure or appreciable deterioration under the high temperatures and other arduous conditions to which they are subjected, and that they have initially and continuing high dielectric strength and arc resistance, high electrical resistance, and good tensile strength. Further, since such articles are in locations where they may very possibly be subjected to oil, such as synthetic oil used in the hydraulic control systems of large airplanes, it is also necessary that the articles have excellent resistance to damage from oil or oil-like substances at elevated temperatures.

It is of the highest importance, where the rubber-like article is held in a housing or shell by and/or retains one or more parts therein by, its resilient compressive engagement with such housing and such part or parts, as when it is made in the form of the above referred to connector insert, that the material have a low compression set value. Not only must such compression set value be initially low, but it must remain low even after subjection of the article to high temperatures for long periods of time, if the article is to function satisfactorily under the arduous conditions to which it is subjected during use.

From the standpoint of desirable economy of manufacture and use, the electrically insulating material should be suitable for molding in existing molds, and for being vulcanized without any accompanying dimensional variations beyond existing tolerances, and the parts so molded must withstand the considerable flexing and distortion, attendant upon assembly and disassembly operations, without damage.

No rubber-like material available in the prior art, particularly an electrically insulating material, combines all the above indicated properties in a completely satisfactory manner. The desired properties which were perhaps poorest in prior materials were, in the following order, those of (1) lack of marked compression set after long periods at high temperature, (2) high dielectric strength at elevated temperatures, (3) high insulation resistance at high temperature, and (4) relatively small loss of physical properties, particularly elongation and tensile strength, after being held at high temperature for long periods of time. Property (1) has a particular bearing on the satisfactory performance of the material as a connector insert, for example. If the insert material has an unsatisfactorily high compression set, the insert becomes loose in the connector shell after subjection to high temperature for a long period of time, thereby incurring the danger of malfunctioning of the connector, as by escape of the insert from the shell. Further, where the insert has an unduly high compression set, the connector pins or sockets mounted thereby may become misaligned or be prone to unwanted removal from the insert upon separation of the connector parts.

The rubber-like composition of the present invention combines all the above-indicated desired properties in an outstanding manner. Such composition has particularly good compression set, dielectric strength, and insulation resistance properties, and loses relatively little of its physical properties upon subjection to high temperatures for long periods. It is thus very satisfactory for use in making articles which are subjected to compression in use and are also subjected to high temperature, which may be required to insulate parts lying relatively near each other, such as the pins or sockets of connectors, such parts having relatively high potential differences between them.

The high temperature resistant electrically insulating rubber-like material of the invention, which fulfills the requirements above set forth, is composed primarily of a mixture of a base compound composed of a major amount of a chloroprene polymer and a smaller amount of a high styrene resin, and a refractory filler material dispersed uniformly throughout the base compound. To such mixture are added small but effective amounts of other ingredients which function to give the resulting material specific properties upon curing and vulcanizing, and to provide in the final articles which are molded or shaped therefrom desired characteristics under the arduous service conditions above outlined. The following table gives the permissible range of variation of a preferred embodiment of the composition of the invention:

Table 1

| | Parts by wt. |
|---|---|
| Neoprene WRT (synthetic rubber base) | 100 |
| Pliolite S-6B (high styrene reinforcing resin) | 5-25 |
| Refractory filler: | |
|     Whitetex (calcined clay) | 20-40 |
|     Suprex (uncalcined hard clay) | 20-40 |
| Magnesia (vulcanizing aid) | 1-8 |
| Zinc oxide (cure balancing agent) | 5-25 |
| Aranox (anti-oxidant) | 0.5-2 |
| Octamine (anti-oxidant) | 2-6 |
| Fortex (plasticizing and dispersing agent) | 3-7 |
| Estergum 8L (dispersing agent) | 3-7 |
| Coloring agents: | |
|     Tipure LW (white) | 0-10 |
|     Pelletex (black) | 0-10 |
| Microcrystalline wax (anti-oxidant) | 1-6 |
| Polyethylene A-C #8406 (molding aid) | 0-4 |
| Na-22 (accelerator and curing agent) | 0.25-1.5 |

A vulcanization retarder may optionally be used in the composition. A suitable retarder is that designated by the trade name "M.B.T.S.-Altax." Such retarder may be employed, for example, in the range from a small but effective amount to 0.5 part, by weight. "M.B.T.S.-Altax" is benzothiazyl disulfide $(C_6H_4NCS)_2S_2$. It is an odorless, yellowish-gray solid.

Neoprene WRT is the trade name of a stabilized chloroprene polymer. "Neoprene" is the generic term for synthetic rubber made by polymerization of 2-chloro-1,3 butadiene. Neoprene Type WRT is a crystallization-resistant type Neoprene; chemically it is a stabilized chloroprene polymer which contains no sulfur, thiuram disulfide or other compounds capable of decomposing either to give free sulfur or a vulcanization accelerator.

"Pliolite S-6B" is a styrene (85%)-butadiene (15%) copolymer.

"Whitetex" is a very white calcined complex aluminum silicate clay. As used herein Whitetex is in very finely divided form, having a particle size such that 65% by weight is below 2 microns in size, the residue on a 200 mesh screen is less than 0.2%, and the residue on a 325 mesh screen is less than 0.5%, all percentages being by weight. The particles are virtually amorphous in form.

Whitetex has an average analysis of

| | Percent by wt. |
|---|---|
| $Al_2O_3$ | 43.75 |
| $SiO_2$ | 54.00 |
| $Fe_2O_3$ | 0.25 |
| $TiO_2$ | 0.75 |
| $K_2O$, $Na_2O$ | 1.25 |

Water soluble salts, less than 0.2%; ignition loss (1600° F., 1 hour)—under 1%.

"Suprex" is an uncalcined hard clay; it is a hydrous aluminum silicate clay in the form of a creamy-white, air-floated powder. As sold it has a specific gravity of 2.60, a moisture content of 1% max., and a particle size of 99.83% through a 325 mesh screen.

Suprex has an average analysis of

| | Percent by wt. |
|---|---|
| $SiO_2$ | 44.26 |
| $Al_2O_3$ | 38.08 |
| $Fe_2O_3$ | 1.58 |
| $TiO_2$ | 0.90 |

The magnesia (MgO) employed is finely divided extra light calcined magnesia, Neoprene grade, sold under the trade name "Maglite D."

The zinc oxide (ZnO) employed is a finely divided material of the grade sold under the trade name "Protox #166."

"Aranox" is a trade-name for N-phenyl-N'-(p-toluenesulfonyl)-p-phenylene diamine.

"Octamine" is a trade-name for a diphenylamine-diisobutylene reaction product.

"Fortex" is a trade-name for a rubber compound material. It is a mixture of hydrophenanthrenic and other vegetable acids chemically treated to block unsaturation. It may be described as a sulphurized mixture of rosin and fatty acids.

"Estergum 8L" is a trade-name for the glycerol ester of wood rosin.

"Tipure LW" is the trade-name of finely divided $TiO_2$. Tipure LW is of a pure white color.

"Pelletex" is a trade-name for a semireinforcing type furnace carbon black.

The microcrystalline wax employed was that sold under the trade-name "Microflake."

"Na-22" is a trade-name for 2 mercapto-imidazoline.

The functions of the various components of the material are generally indicated in Table I, above. The functions of some of the components will now be set forth with greater particularity.

The high styrene resin, such as "Pliolite S-6B," is a very important ingredient in the composition of the invention. It functions to reinforce the chloroprene polymer (Neoprene WRT), and allows increased hardness of the vulcanized material with lower filler loading, while maintaining good physical properties in the material. Because it is a thermoplastic resin, the high styrene resin is not vulcanized in the finished phase of the composition. This prevents heat embrittlement of the material, and contributes to the superior high temperature aging properties of the material. It also contributes to the superior electrical properties of the material, including high insulation resistance, high dielectric strength, and high arc resistance.

The high styrene resin also decreases the absorption of water by the finished, vulcanized material, and serves as a thermoplastic processing aid, thus contributing to the excellent moldability of the composition. Because of the low specific gravity of the high styrene resin, its use in the composition also contributes to the desirable lighter weight of the material.

The superior properties of the material of the invention, after vulcanization, are produced in a large measure by the inclusion therein of a mineral filler composed of a combination of calcined and uncalcined clays of the type specified. If the mineral filler were to be composed wholly or substantially wholly of a hard clay such as Suprex, the resulting vulcanized material would be too hard and would have a high compression since such hard clay acts to reinforce the material. The calcined clay filler, such as Whitetex acts to give a resilient product which does not assume a compression set. The use of a mineral filler composed of the combination of hard and calcined clays of the types and in the amounts and ratios above specified produces a material which, when vulcanized, balances the compression set tendency of the hard clay with the resilience and lack of compression set tendency of the calcined clay, thereby producing a material having the outstanding properties set forth below.

The calcined magnesia functions as a vulcanizing agent, an acid acceptor, and a stabilizer. It also increases the resistance of the mix to scorching and bin curing.

The zinc oxide functions as a modifying agent, balancing the curging of the material, functioning as an acid acceptor, and insuring good aging and heat resistant properties in the material. Zinc oxide increases the rate of set-up of Neoprene compounds in the early stages of their cure, thereby aiding in producing a flat cure curve.

Aranox acts as a strong inhibitor of oxidation, and is effective in stabilizing the material against premature setup and bin scorch. It stabilizes cured Neoprene against breakdown and release of chlorine during aging, as well as aiding in giving the material excellent heat aging characteristics.

Octamine functions as an anti-oxidant. In combination with Aranox it imparts optimum heat resistance to the material.

Polyethylene is a waxy material which, at high temperature, contributes to the easier flow of the mix. It also provides surface protection for the molded parts. "Polyethylene A–C #8406" is one of several grades of polyethylene which may be used in the composition of the invention. Various other polyethylenes, such as that known as A–C #8417, are also satisfactory.

From the standpoint of function the composition set out in Table I may be partially retabulated as follows:

*Table II*

|  | Parts by Wt. | Total |
|---|---|---|
| Reinforcing Resin—Pliolite S-6B | 5-25 | 5-25 |
| Refractory Filler: |  | 40-80 |
| Whitetex | 20-40 |  |
| Suprex | 20-40 |  |
| Accelerator and Curing Agent: |  | 5.25-26.5 |
| Zinc Oxide | 5-25 |  |
| Na-22 | 0.25-1.5 |  |
| Vulcanizing Aid—Magnesia | 1-8 | 1-8 |
| Anti-oxidant: |  | 3.5-14 |
| Aranox | 0.5-2 |  |
| Octamine | 2-6 |  |
| Microcrystalline Wax | 1-6 |  |
| Plasticizer and Dispersing Agent: |  | 6-14 |
| Fortex | 3-7 |  |
| Estergum 8L | 3-7 |  |

Variation of the composition within the ranges defined in Table I provides property characteristics within a prescribed desired range of limits. A composition lying within the ranges defined in Table I, and having characteristics presently preferred for the making of contact-bearing inserts for separable electrical connectors, is that given by the following:

EXAMPLE

| | Parts by Wt. |
|---|---|
| Neoprene WRT | 100 |
| Pliolite S-6B | 15 |
| Whitetex | 27.5 |
| Suprex | 27.5 |
| Magnesia | 4 |
| Zinc oxide | 15 |
| Aranox | 1 |
| Octamine | 4 |
| Fortex | 5 |
| Estergum 8L | 5 |
| Tipure LW | 5 |
| Pelletex | 4 |
| Microflake | 4 |
| Polyethylene A–C #8406 | 4 |
| Na–22 | 0.875 |
| Specific Gravity | 1.53 |

The above specific gravity is markedly lower than those of prior art materials designed for similar uses. Thus the preferred composition set forth in application Ser. No. 641,863, filed February 25, 1957, has a specific gravity of 1.81, and another prior composition for the same use, composition B below, has a specific gravity of 1.64.

It is to be understood that within the teaching of the invention some variations are possible. Thus the following permissible substitutes may replace the indicated components part for part by weight:

Pliolite S–6B may be replaced by various high styrene butadiene copolymers, such as "Marbon 8000," by "Goodrite Resin 50," also a high styrene copolymer, or by any other high styrene resin suitable for rubber compounding. Marbon 8000 is a rubber-reinforcing high-styrene resin; such resin is in the form of a white, friable granular powder which chemically consists of from 70–85% styrene and 30–15% butadiene. Goodrite Resin 50 is a high-styrene butadiene copolymer. It is sold as a free flowing powder, 85% of which passes a 100 mesh screen. It has a specific gravity of 1.05.

Whitetex may be replaced by "Whitetex No. 2," which is an electrical grade complex silicate clay, or by any other calcined clay.

Suprex may be replaced by "Dixie Clay," sold by R. T. Vanderbilt Co., Inc., or by "Buca" clay, sold by Southern Clays, Inc. or any other hard clay.

Polyethylene A–C #8406 or A–C #8417 may be replaced by polyethylene A–C #8417D or any other low molecular weight polyethylene suitable for rubber compounding.

Pelletex may be replaced by any non-staining type of SRF carbon black or by HMF or HAF type carbon black.

The material of the present invention may be mixed or compounded in accordance with standard practice. The mixing may be carried out either in rubber mills or in Banbury mixers, for example; the base material, initially, and later the mixtures are held at temperatures during the various mixing stages which are conducive to the most effective dispersion of the particular component or components being added.

A preferred procedure for making the material of the invention is as follows:

The Neoprene and high styrene resin are broken down together on a hot mill having its rolls at a temperature of 150–200° F. to form a master batch. After the components of the master batch are thoroughly blended, the master batch material is then sheeted off the mill and allowed to cool.

The master batch is banded on a tight cold mill, and then the magnesia is added first and thoroughly blended into the base material of the master batch. The Aranox, Tipure, Pelletex, Suprex, Whitetex, Microflake, polyethylene, and Octamine are then added to the base material while being thus banded, and are thoroughly blended into the base material.

Next the Estergum 8L and Fortex are added either together or sequentially, and are thoroughly blended into the base material while it is being banded. After this, the zinc oxide is added to the base material and is thoroughly blended therein while such material is being banded.

After the material has been compounded, it may either be molded immediately or may be stored for a reasonable period of time before being molded. If the material is to be shipped prior to being molded, the unvulcanized compound should be suitably packed to prevent contamination or other damage in transit. Slight sticking together of layers of material is not objectionable provided separation of the layers without tearing is possible. Talc, soapstone, or similar materials should not be used as anti-sticking agents, because they would produce harmful inclusions in the final molded articles made from the material.

Unvulcanized material is preferably stored in a cool, dry location at a temperature not higher than 50° F. Optimumly the material is molded as soon after being compounded as is practicable, although the material may be molded and vulcanized as much as four weeks after being compounded with no appreciable deterioration in the properties of the finished articles.

The material may be molded in a conventional manner. The above discussed contact pin-retaining inserts, for example, are conveniently molded in a multiple cavity mold heated by press platens. Following the molding step, the molded articles are vulcanized or cured. Such cure may be either (1) a relatively long cure in the mold, for example 60 minutes at 350° F., or (2) a short cure in the mold, followed by a secondary curing of the articles after their removal from the molds. A typical cure (2) includes curing the articles in the mold for 10 minutes at 300–320° F., followed by a secondary, "Homo" cure. Details of such Homo cure are given in Winkler application, Ser. No. 312,040, filed September 29, 1952. A typical Homo cure useful as a secondary cure in procedure (2) involves holding the articles in an atmosphere of steam at 350° F. for 2½ hours. As is evident in Table V below, curing in accordance with procedure (2) gives better compression set values, although both the long cure (procedure 1) and the short cure followed by a Homo cure (procedure 2) produce results which exceed the values required by U.S. Government specifications.

The composition of the invention, when molded and vulcanized in accordance with procedure (2), has the following properties. The test procedures employed on the originials were in accordance with A.S.T.M. standards; the test procedures employed in the tests after immersion of the test samples are noted below.

*Table III*

Original Properties:
    Tensile _____p.s.i. min__  1800–2000
    Elongation _____percent min__   500–700
    Durometer _____Shore A__    76–80

Electrical Properties after 48 hours immersion in distilled water at 120° F.:
    Dielectric strength ____volts/mil. min__   400+
        (MIL–M–14 procedure)
    Arc resistance _____seconds__   115–125
        (MIL–M–14 procedure)

The composition when molded and vulcanized in accordance with procedure (2) possesses excellent resistance to aging at elevated temperatures. The following tests were conducted in conformity with A.S.T.M. standards.

*Table IV*

Aging—96 hrs. @ 300° F.; Geer Oven-circulating air:
Tensile, p.s.i.—1400–1700
Elongation, percent—100% min., up to 160%
Surface—No cracks, no hardening
180° Bend—No cracks
Durometer increase—+15 max. (in general below maximum)

The material of the invention displays outstanding compression set values, is resistant to cracking when bent in the cold, and successfully withstands prolonged immersion in oil, as shown by the following test results:

*Table V*

Compression set: 30% compression
Compression set: 70 hrs. @ 300° F.

Percent Set, ASTM, Method B: (1) Long cure, 65–70%; (2) Short cure plus Homo cure, 50–60%.
Cold test: 5 hrs. @ 40° F.
    180° Bend: No cracking.
Oil Immersion: 24 hrs. @ Room Temp.: 50/50 #30 oil/aviation gasoline:
    180° Bend: No cracking.
    Durometer change: −7.
    Surface: No tackiness or decomposition.

The above compression test was conducted on ½″ thick buttons cured (1) for 60 minutes at 350° F. (Long Cure), and on similar buttons cured (2) at a temperature of 300–320° F. for 10 minutes followed by a Homo Cure. In both cases the compression set values of the samples were excellent, and were markedly better than those for prior art compositions designed for the same general uses.

Tests conducted on a large number of molded and vulcanized inserts, for separable electrical connectors, made of material in accordance with the above example show such material to have excellent properties for such use, as well as for other allied applications. Thus such tests reveal no failures in the high potential test, no failures in the test for air leakage of the inserts following their long subjection to elevated temperature, and no objectionable change in dimensions following such high temperature treatment. The material meets all requirements as set forth by Military Specification Mil–C–5015C titled "Connectors, Electrical, 'AN' Type." The molded and vulcanized inserts are sufficiently resilient to present no difficulty in assembling the inserts into the connector shells, an operation which requires marked elastic deformation of the inserts. The inserts made of material in accordance with the invention retain their pin or socket contacts with a force and an accuracy which markedly exceed those of rigid specification requirements.

Upon assembly of the inserts into their shells, the inserts made of the material of the example did not become loose in their shells even after being subjected to a temperature of 426 hours at 257° F. By way of comparison, typical inserts made of the best all-around prior art material for such purpose became loose in their shells after having been heated at 257° F. for only 48 hours.

The material of the present invention also displays marked advantages in its lack of material changes in its properties upon being subjected to high humidity atmospheres for long periods, both at ambient and at elevated temperatures, and its markedly better properties in the retention of a large part of its initial insulation resistance at high temperatures.

The improvement in the insulation resistance of inserts made in accordance with the invention is strikingly shown in the following table setting forth the results of 1000 hour cycle insulation resistance tests upon a number of inserts made in accordance with the example, here designated A, and upon a comparable number of inserts made of the best all-around prior art material for such purpose, here designated B. Material B has the following composition:

Neoprene type GN _____ 100
Extra light MgO _____ 4
ZnO _____ 5
Suprex _____ 80
Stearic acid _____ 1
Tipure LW _____ 10
Pelletex _____ 4
Crown Wax 500 _____ 4
Thermoflex A _____ 1
                                                ———
    Total _____ 209

Specific Gravity 1.64

Neoprene type GN is a chloroprene polymer stabilized with thiuram disulfide. Crown Wax 500 is a microcrystalline petroleum wax having a melting point of 190°–195° F. and having a maximum penetration with 100 grams at 77° F. of 10 (ASTM D5–25).

*Table VI*

INSULATION RESISTANCE BETWEEN CONTACTS, 1,000 HOUR CYCLE TEST AT 257° F.

[Resistance in megohms]

| Material | Initial | 96 Hrs. | 1,000 Hrs. |
|---|---|---|---|
| A | 80,000–180,000 | 200,000–500,000 | 100,000–150,000 |
| B | 37,000–50,000 | 100,000–200,000 | 280–500 |

The initial resistance of material A, made in accordance with the invention, is from 1½ to 4½ times greater than that of the prior art material B. The resistance of material A after being heated at 257° F. for 96 hours ranges from the same as that of material B, when the latter has undergone the same treatment, to 5 times that of material B. The resistance of material A after being heated at 257° F. for 1000 hours ranges from 200 to 535 times that of material B which has undergone the same treatment. Thus the rubber-like electrically insulating material of the present invention displays marked advantages over prior art rubber-like electrically insulating materials, for use at elevated temperatures for long periods of time.

The material of the invention also displays marked advantages in the retention of its physical properties after long subjection to high temperatures. Thus after 1000 hours at 257° F. the material of the example could still be flexed without cracking, whereas after the same treatment similar pieces made of the same material as inserts B above were very brittle.

The material of the invention retains an insulation resistance markedly above 5000 megohms after being held at 257° F. for 1000 hours. Prior elastomeric materials cannot do this; no samples of material B (Table VI) retained an insulation resistance of even as high as 5000 megohms after being held for 600 hours at 257° F. The material of the invention also displays a greater retention of its initial insulation resistance when such resistance is measured at elevated temperature.

The material of the invention displays consistently appreciably higher electrical resistance values in graphs of electrical resistance vs. time, when the material is subjected to a humid atmosphere, for example, at atmosphere which is 95% moisture saturated at 120° F. Thus, whereas prior materials, such as material B above, when treated in such manner up to 400 hours have electrical resistance values in the range of 2,500 to 5,000 megohms, the material of the invention when similarly treated and tested has electrical resistance values in the range of 20,000 to 60,000 megohms.

It will be apparent from the above that the composition of the invention and the articles made therefrom display great advantages in many applications where rubber-like material is subjected to high temperatures for long periods of time, and it is necessary or highly desirable that the articles made of such composition shall retain at least a large portion of their initial properties throughout their operating life. The method of making such composition, and of molding and vulcanizing the resulting articles, also display marked advantages over the prior art, by reason of their ease of control, and the economy of time and equipment incident to their practice.

Although for purposes of illustration only preferred ranges of components and a specific example of high temperature resistant rubber-like material in accordance with the invention, as well as some variations thereof, have been disclosed, it will be understood that various other changes may also be made without departing from the spirit and scope of the invention as the same will now be understood by those skilled in the art.

What is claimed is:

1. A moldable and vulcanizable high temperature resistant rubber-like material comprising about 100 parts of a base compound composed of a chloroprene polymer, from about 5 to 25 parts of a high styrene resin, and from about 40 to 80 parts of a finely divided refractory filler material composed essentially of a mixture of hard and calcined clays having a weight ratio lying within the range 1:2 to 2:1, all parts being by weight.

2. A moldable and vulcanizable high temperature resistant rubber-like material comprising about 100 parts of a base compound composed of a chloroprene polymer, from about 5 to 25 parts of a high styrene resin, and from about 40 to 80 parts of a finely divided refractory filler material composed essentially of a mixture of hard and calcined clays, each being present in the range of 20 to 40 parts by weight, all parts being by weight.

3. A material as defined in claim 2, wherein the high styrene resin is a styrene butadiene copolymer of high styrene content.

4. A molded and vulcanized article comprising a high temperature resistant material comprising about 100 parts of a base compound composed of a chloroprene polymer, from about 5 to 25 parts of a high styrene resin, from about 20 to 40 parts of a hard clay, and from about 20 to 40 parts of a calcined clay, all parts being by weight.

5. A molded and vulcanized article having a low compression set, high dielectric strength, and high insulation resistance, said article comprising a high temperature resistant electrically insulating material comprising about 100 parts of a base compound composed of a chloroprene polymer, from about 5 to 25 parts of a high styrene resin, from about 20 to 40 parts of a hard clay, and from about 20 to 40 parts of a calcined clay, all parts being by weight.

6. An article as defined in claim 5 wherein the high styrene resin is a copolymer containing a major amount of styrene and a minor amount of butadiene.

7. A moldable and vulcanizable high temperature resistant rubber-like electrically insulating material comprising about 100 parts of a base compound composed of a chloroprene polymer, from about 5–25 parts of a styrene-butadiene copolymer of high styrene content, from about 20 to 40 parts of a hydrous aluminum silicate hard clay, from about 20 to 40 parts of a calcined complex aluminum silicate clay, and small but effective amounts of an accelerator, of a vulcanizing agent, and of an anti-oxidant, all parts being by weight.

References Cited by the Examiner

UNITED STATES PATENTS

| | | | |
|---|---|---|---|
| 2,617,129 | 11/1952 | Petze | 260—41.5 |
| 2,794,792 | 6/1957 | Petze | 260—41.5 |
| 2,865,777 | 12/1958 | Allen et al. | 260—41.5 |

OTHER REFERENCES

Hackh's Chemical Dictionary, The Blakiston Co., Philadelphia, Pa., 3rd Edition (1944), p. 206.

Whitby, "Synthetic Rubber," published by John Wiley & Sons (1954), chapter 22, page 781.

MORRIS LIEBMAN, *Primary Examiner.*

LEON J. BERCOVITZ, DANIEL ARNOLD, *Examiners.*

H. L. SATZ, R. C. STEWART, K. B. CLARKE,
*Assistant Examiners.*